United States Patent
de Lange

(10) Patent No.: US 9,321,134 B2
(45) Date of Patent: Apr. 26, 2016

(54) CLAMPING DEVICE FOR CENTRING PIPES

(75) Inventor: Wilco de Lange, Kälarne (SE)

(73) Assignee: HERCULES PIPING TOOLS ENGINEERING B.V., Nieuwegein (NL)

( * ) Notice: Subject to any disclaimer, the term of this patent is extended or adjusted under 35 U.S.C. 154(b) by 1061 days.

(21) Appl. No.: 13/278,369

(22) Filed: Oct. 21, 2011

(65) Prior Publication Data

US 2012/0098251 A1   Apr. 26, 2012

Related U.S. Application Data

(60) Provisional application No. 61/405,291, filed on Oct. 21, 2010.

(30) Foreign Application Priority Data

Oct. 21, 2010   (NL) ...................................... 2005555

(51) Int. Cl.
*F16L 7/00* (2006.01)
*B23K 37/053* (2006.01)

(52) U.S. Cl.
CPC .................................. *B23K 37/0531* (2013.01)

(58) Field of Classification Search
CPC ........... B23P 11/00; B23P 23/00; B23P 25/00
USPC ......... 29/271, 272, 255, 243.56, 243.55, 280; 285/123.1; 73/865.8; 228/105, 212, 228/49.3, 44.5, 216; 269/48.1, 49; 219/61.1, 101
See application file for complete search history.

(56) References Cited

U.S. PATENT DOCUMENTS

| | | | | |
|---|---|---|---|---|
| 2,413,103 A | * | 12/1946 | Forbes, Jr. | 269/34 |
| 2,429,053 A | * | 10/1947 | Forbes, Jr. | 29/234 |
| 2,906,226 A | * | 9/1959 | Myrick | B23K 37/0531 |
| | | | | 228/44.5 |
| 3,031,994 A | * | 5/1962 | Clark | 269/34 |
| 3,044,431 A | * | 7/1962 | Cummings | 269/34 |
| 3,362,603 A | * | 1/1968 | Bauer et al. | 228/5.1 |

(Continued)

FOREIGN PATENT DOCUMENTS

| CA | 1 060 488 | 8/1979 |
|---|---|---|
| JP | 9 253888 | 9/1997 |

OTHER PUBLICATIONS

Dutch Search Report dated Jun. 15, 2011, corresponding to Foreign Priority Application No. NL2005555.

*Primary Examiner* — Lee D Wilson
*Assistant Examiner* — Mahdi H Nejad
(74) *Attorney, Agent, or Firm* — Young & Thompson

(57) ABSTRACT

A clamping device (1) for internally centering pipes with respect to one another includes two clamping heads (5, 6), which can be placed into the mutually facing ends of the pipes. The clamping heads each have radially displaceable clamping shoes (7) which are evenly distributed over its external periphery and a drive mechanism (8) for causing the radial displacements of the clamping shoes. Adjusting piston/cylinder devices (10) are provided for adjusting the mutual positions of the clamping heads in the axial direction and a guide element (11) for guiding the clamping heads in the axial direction with respect to one another. Bearings (13) are provided on at least one (5) of the clamping heads and on the guide element (11). The guide element has several guide bodies (12) which are positioned in an eccentric manner in connection with the stability of the clamping heads.

20 Claims, 4 Drawing Sheets

(56) References Cited

U.S. PATENT DOCUMENTS

| | | | | |
|---|---|---|---|---|
| 3,387,761 A * | 6/1968 | Pickard | | 228/42 |
| 3,445,104 A * | 5/1969 | Douglas | | 269/48.1 |
| 3,561,320 A * | 2/1971 | Nelson et al. | | 228/213 |
| 3,633,813 A * | 1/1972 | Looney et al. | | 228/41 |
| 3,644,977 A * | 2/1972 | Valentine | | 29/244 |
| 3,653,573 A * | 4/1972 | Brown | | B23K 37/0531 219/60 A |
| 3,699,635 A * | 10/1972 | Bradley et al. | | 29/252 |
| 3,732,391 A * | 5/1973 | La Force et al. | | 219/67 |
| 3,733,939 A * | 5/1973 | Paysinger | | B23B 5/162 144/205 |
| 3,742,186 A * | 6/1973 | Finkel et al. | | 219/160 |
| 3,750,928 A * | 8/1973 | Valentine | | 228/44.3 |
| 3,765,665 A * | 10/1973 | Work | | 269/27 |
| 3,825,165 A * | 7/1974 | Howell | | 228/50 |
| 3,920,171 A * | 11/1975 | Clavin | | B23Q 9/0021 228/213 |
| 3,937,382 A * | 2/1976 | Cunningham | | B23K 37/0531 228/49.3 |
| 3,979,041 A * | 9/1976 | Kaneyama et al. | | 228/49.3 |
| 4,042,231 A * | 8/1977 | Kopczynski | | B23K 37/0531 269/48.1 |
| 4,053,973 A * | 10/1977 | Meli | | B23K 37/0531 228/44.5 |
| 4,059,072 A * | 11/1977 | Vassallo et al. | | 119/51.13 |
| 4,140,262 A * | 2/1979 | Wilson et al. | | 228/49.3 |
| 4,159,072 A * | 6/1979 | Lajoie | | B23K 37/0531 228/49.3 |
| 4,253,599 A * | 3/1981 | Slavens | | B23K 37/0531 228/49.3 |
| 4,273,985 A * | 6/1981 | Paton et al. | | 219/101 |
| 4,323,752 A * | 4/1982 | Paton et al. | | 219/101 |
| 4,436,974 A * | 3/1984 | Lebedev et al. | | 219/66 |
| 4,582,241 A * | 4/1986 | Johnson | | 228/49.3 |
| 4,648,544 A * | 3/1987 | Puisais et al. | | 228/44.5 |
| 4,689,863 A * | 9/1987 | Weber | | B23B 5/162 228/49.2 |
| 4,712,720 A * | 12/1987 | Tesch | | 228/49.3 |
| 5,288,005 A * | 2/1994 | Beakley et al. | | 228/49.3 |
| 5,356,067 A * | 10/1994 | Leduc | | 228/44.5 |
| 5,535,938 A * | 7/1996 | Leduc | | 228/212 |
| 5,816,475 A * | 10/1998 | Brookhouse | | 228/49.3 |
| 6,572,002 B2 * | 6/2003 | Faroldi | | 228/8 |
| 6,837,646 B1 * | 1/2005 | Minger | | 403/374.4 |
| 7,617,558 B2 * | 11/2009 | Boe | | B08B 9/049 15/104.061 |

* cited by examiner

CLAMPING DEVICE FOR CENTRING PIPES

This application claims the benefit under 35 U.S.C. 119(e) of U.S. Provisional Application No. 61/405,291, filed on Oct. 21, 2010.

The invention relates to a clamping device for internally centering pipes with respect to one another, comprising two clamping heads which can be placed into the mutually facing ends of the pipes, wherein each of the clamping heads comprises radially displaceable clamping shoes which are evenly distributed over its external periphery and a drive mechanism for causing the radial displacements of said clamping shoes, adjusting means for adjusting the mutual positions of the clamping heads in the axial direction, a guide means which extends axially and bearings which are provided on at least one of the clamping heads and on said guide means.

Such a clamping device is known from U.S. Pat. No. 4,253,599. This known clamping device has a centrally placed solid shaft comprising sections of different diameters. One of the clamping heads is fixedly attached to these shaft sections, while the other clamping head is displaceable in the axial direction so as to be able to adjust the desired gap width between the ends of the pipes. In this case, the clamping shoes engage with the internal surface of the pipes in order to ensure a tight connection between each clamping head and the associated pipe.

The gap width plays an important role when the pipes are to be welded together. It is therefore very important that the size of the gap is uniform along the entire periphery thereof, so that the weld which is ultimately produced has the desired uniform properties. In this case, the position of the clamping heads with respect to one another is of overriding importance. This means that the clamping heads have to be kept parallel to one another, both when effecting the tight connection between each clamping head and the associated pipe and when displacing the clamping heads with respect to one another in order to set the desired gap width. According to the abovementioned prior art, the central shaft has to ensure the position of the clamping heads with respect to one another during said process.

However, the pipes which are tightly connected by means of the clamping device may cause bending moments which can result in deformation of the central shaft. This deformation will result in the clamping heads no longer being in the correct, parallel position with respect to one another, as a result of which the gap width may vary across the periphery thereof. The weld would then no longer have the desired uniform properties, which adversely affects the reliability and safety of the resultant line.

It is therefore an object of the invention to provide a clamping head of the type mentioned in the preamble which is better able to maintain the desired gap width and uniformity of the gap between the pipes. Said object is achieved by the fact that the guide means comprises several guide bodies and the guide bodies are positioned in an eccentric manner.

With the clamping device according to the invention, the clamping heads are supported with respect to one another by several guide bodies, in such a manner that any bending moments cause less high bending loads in each guide body per se. In addition, said guide bodies are situated at some distance from the neutral line, which results in a further reduction of deformations. The clamping device according to the invention is thus better able to maintain the desired gap width uniformity of the gap along the entire periphery thereof, even with bending loads which could be caused by the clamped pipes.

Preferably, the guide bodies are evenly distributed in the peripheral direction of the clamping heads, thus ensuring uniform behaviour of the clamping device. The guide bodies can be fixedly attached to one of the clamping heads, while the other clamping head is displaceable with respect to the guides. The adjusting means may be fixedly connected to the guide bodies and to a clamping head which is displaceably supported with respect to said guide bodies. These adjusting means may comprise an axial adjustment actuator, such as a hydraulic piston/cylinder device.

Usually, the clamping device is situated in one of the pipes to be connected to one another, with the other pipe then being aligned with respect to the first pipe. This can be simplified if an introduction head is provided which is configured so as to become narrow towards its free end. In this case, the guide bodies and the adjusting means may be attached to the introduction head. Preferably, the clamping head which is displaceably supported with respect to the guide means is situated between the introduction head and the other clamping head which is fixedly connected to the guide means.

The drive mechanism may be configured in many different ways. However, preference is given to the configuration wherein the drive mechanism of each clamping head comprises a drive disc which is oriented transversely with respect to the axial direction and which is displaceably supported on the guide bodies by means of bearings, which drive disc cooperates with the clamping shoes in such a manner that upon axial displacement of the drive disc, the clamping shoes are displaced radially. The guide bodies are then also used for the operation of the drive mechanism, which provides an additional advantage. The drive disc and the associated clamping shoes can cooperate with one another by means of slide faces which are directed obliquely in axial cross section. In connection with fixing the position of the clamping shoes with respect to the drive disc, even when the clamping shoes are withdrawn when the clamping action on the pipe is discontinued, the drive disc and the clamping shoes can cooperate with one another by means of an undercut slot and a widened head which can be moved to and fro in said undercut slot.

The drive mechanism may comprise an axial drive actuator, such as a hydraulic piston/cylinder device. Furthermore, each clamping head may comprise a support disc which is oriented transversely with respect to the axial direction and which cooperates with the guide bodies. In addition, each clamping head may comprise a support sleeve which is attached to the support disc, which support sleeve has radial guides for the clamping shoes. Thus, the clamping heads together form a more or less closed housing in which the guide bodies with the sliding bearings are situated. These components are thus well protected against external influences, in such a manner that correct operation of the clamping device is ensured. This can be achieved, in particular, with the embodiment wherein the mutually facing ends of the support sleeves of both clamping heads cooperate in a sealing manner with one another.

In an efficient embodiment, the drive actuator may be attached to the support disc and to the drive disc. Furthermore, the clamping heads may each carry a clamping roll which is oriented along an axially directed axis of rotation. The clamping rolls can position themselves correctly in such a position with respect to the inner wall of the pipe that no undesired transverse loads and bending moments on the clamping shoes and the guides thereof are caused.

The invention will now be explained with reference to an exemplary embodiment illustrated in the figures, in which.

Figure 1:
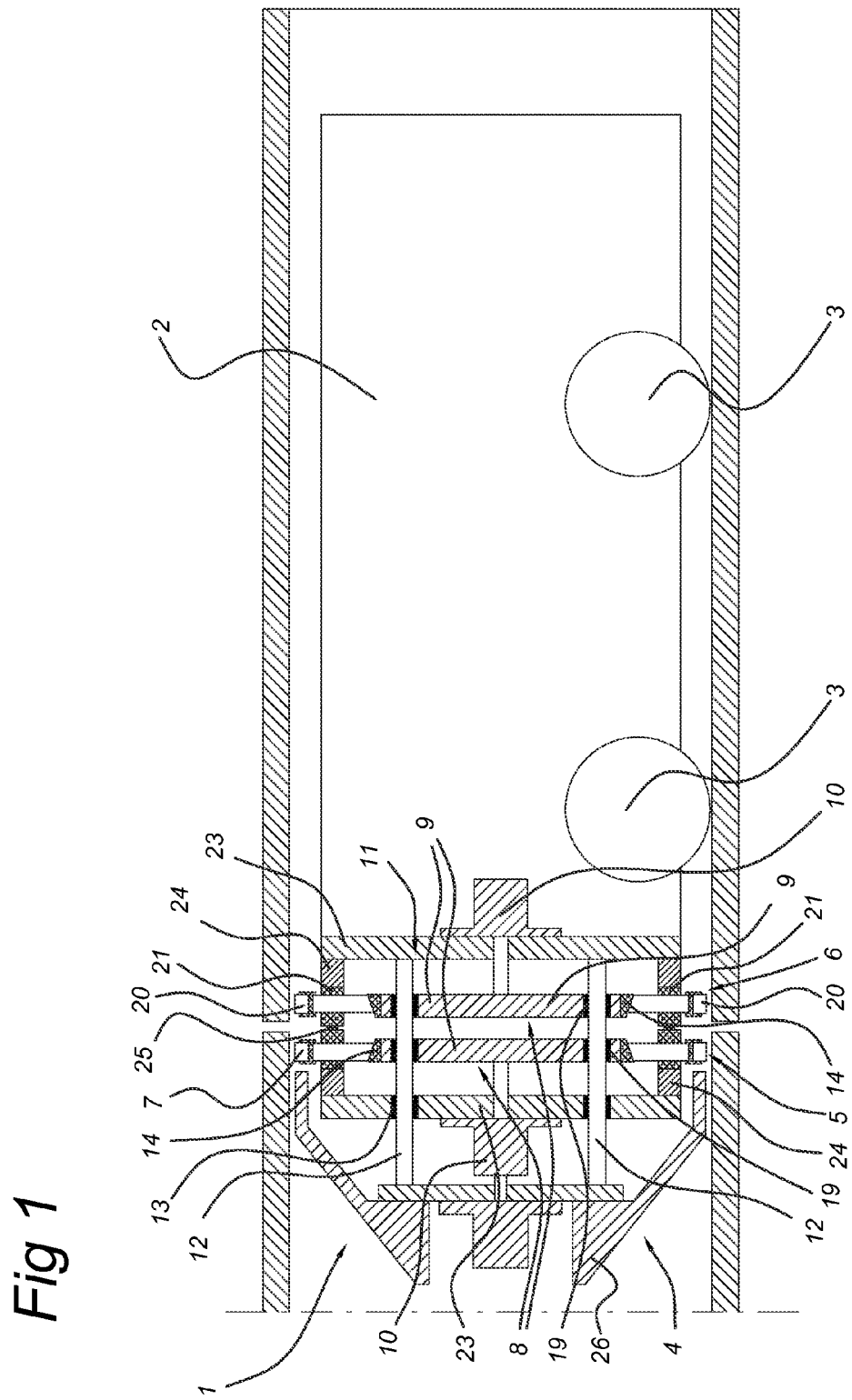
FIG. 1 shows an axial cross section through the clamping device.
Figure 2:
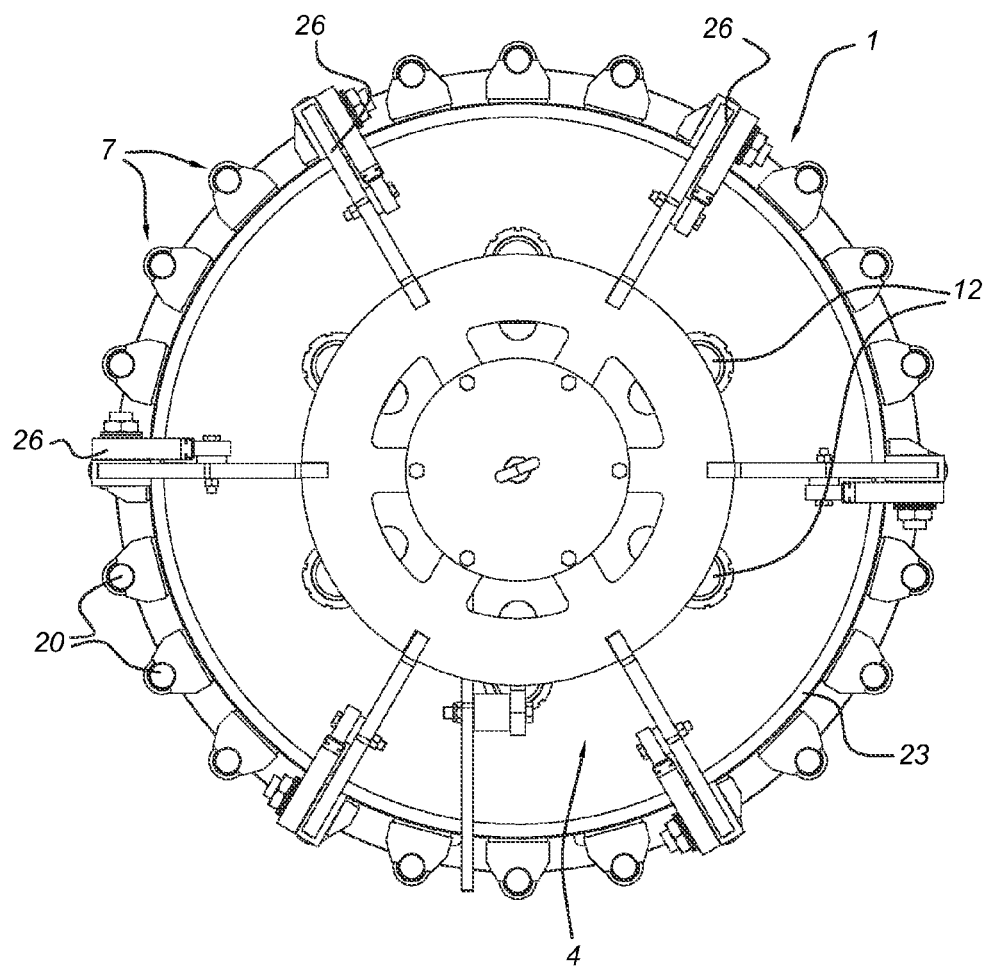
FIG. 2 shows an end view of the clamping device.
Figure 3:
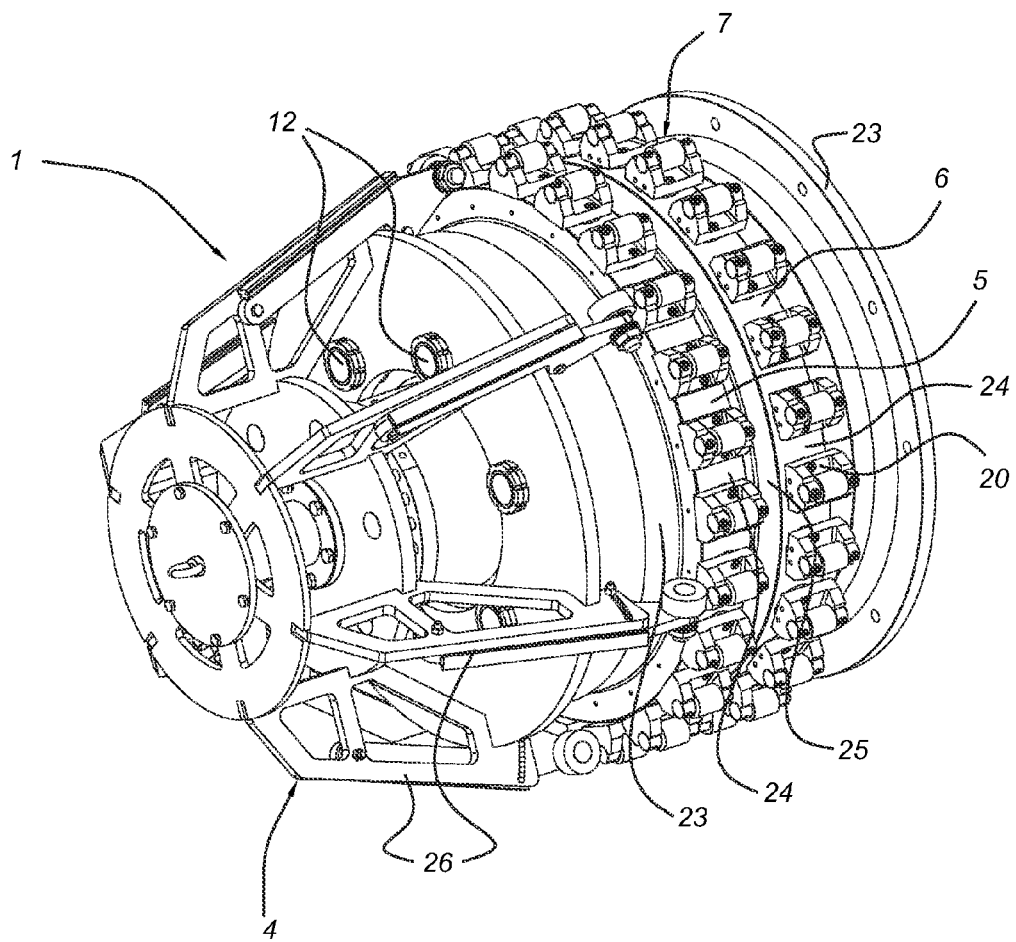
FIG. 3 shows a perspective view of the clamping device.

The clamping device 1 illustrated in FIG. 1 in axial cross section is suspended on a carriage 2 (not shown in more detail) which is known per se and has wheels 3 by means of which the clamping device can be driven through a diagrammatically illustrated pipe. Using the introduction head 4, which has ribs 26 which narrow towards the front, a further pipe can initially be roughly positioned with respect to the preceding pipe, as is also illustrated in FIG. 1. Ultimately, these pipes can be positioned accurately with respect to one another by means of the clamping device 1 and be placed at the desired distance from one another in order to be able to weld these pipes to one another.

To this end, the clamping device 1 has two clamping heads 5, 6, namely a first (right) clamping head 6 and a second (left) clamping head 5, each of which is situated in one of the pipes. These first and second clamping heads 5, 6 are displaceably guided with respect to one another by a guide means 11, which in the illustrated exemplary embodiment comprises six cylindrical guide bodies 12 which are fixedly attached at one end to the first clamping head 6 which is situated on the right-hand side in FIG. 1. Furthermore, the guide means 11 consist of the sliding bearings 13 by means of which the second clamping head 5 can be moved to and fro along the guide bodies 12.

At the other end, the guide bodies 12 are attached to the introduction head 4. Furthermore, an adjusting means in the form of the hydraulic piston/cylinder device 10 is attached to said introduction head 4 and is also attached to the second (left) clamping head 5. By operating this hydraulic piston/cylinder device 10 in the desired manner, the distance between the first and second clamping heads 5, 6 can be varied in order to set the desired gap width between the clamped pipes.

The clamping heads 5, 6 each have clamping shoes 7 which are evenly distributed in the peripheral direction and which ultimately have to be pressed against the inner wall of the respective pipe in order to clamp the latter. To this end, the clamping shoes 7 have to be pushed radially outwards and be pulled radially inwards upon loosening. To this end, each clamping head 5, 6 has a drive mechanism which is denoted overall by reference numeral 8. These drive mechanisms 8 have drive discs 9 which extend transversely to the axial direction of the clamping device 1 and can be moved to and fro by means of the hydraulic piston/cylinder devices 10.

Figure 4:
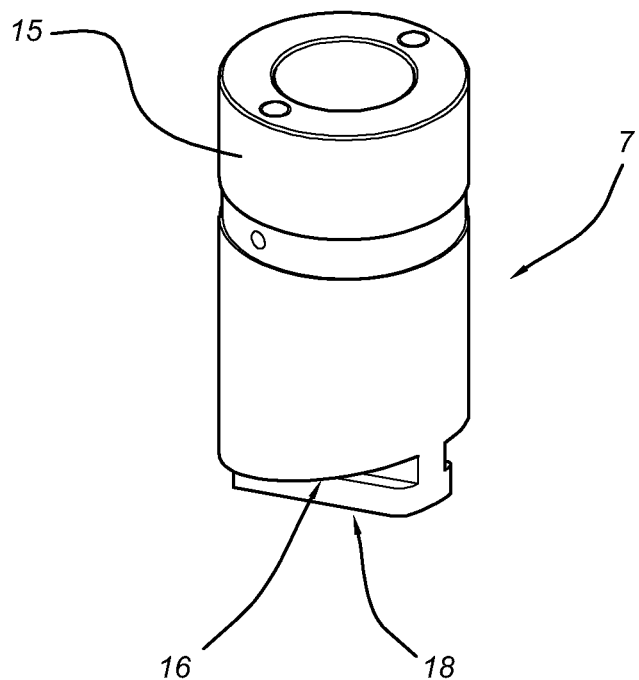
FIGS. 4 and 5 show components of the clamping shoe/drive disc.
Figure 5:
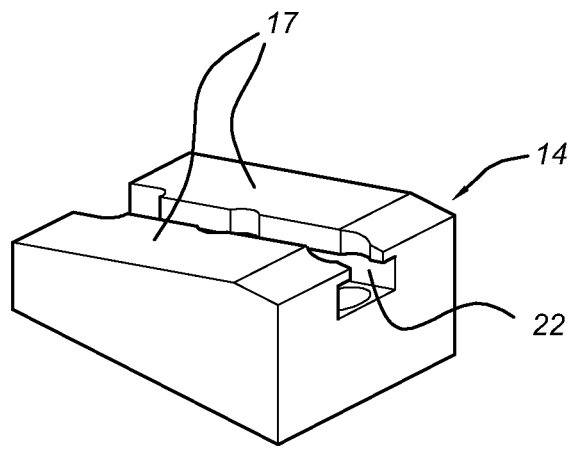

In this connection, wedges 14, which are illustrated in FIG. 5, are attached to the periphery of the drive discs 9 and are each provided with obliquely directed wedge surfaces 17. The clamping shoes 7 each have the guide pins 15 illustrated in FIG. 4, the bottom surfaces 16 of which are obliquely directed in a corresponding manner. Furthermore, each wedge has an undercut cavity 22, while each guide pin 15 has a widened head 18. This widened head 18 fits into the undercut cavity 22 in a displaceable manner.

Each guide pin 15 is accommodated in a radially oriented cylinder 21 forming a radial guide so as to be displaceable in the radial direction. Thus, when the drive discs 8 are moved to and fro, the guide pins 15 are extended or retracted, respectively, in order to clamp or release the pipes by means of the clamping shoes 7. The clamping shoes 7 each have roller members 20 whose axis of rotation is oriented in the axial direction. When these roller members 20 push against the inner wall of the respective pipe, they can roll slightly along said inner wall and then settle. This ensures that the clamping shoes 7 are only exposed to radial forces and that bending moments and transverse forces which could cause blocks are avoided.

What is furthermore important is the fact that the drive discs 9 are each displaceably supported on the guide bodies 12 by means of sliding bearings 19 in such a way that stable operation of the drive mechanisms 8 is ensured.

Each of the first and second clamping heads 5, 6 furthermore has a support disc 23 to the outer periphery of which a support sleeve 24 is attached. With the first clamping head 6 which is on the right-hand side in FIG. 1, the guide bodies 12 are fixedly attached to the support disc 23, and with the second clamping head 5 which is on the left-hand side, the support disc 23 is displaceably supported with respect to the guide bodies 12 by means of the sliding bearings 13. Attached to the support discs 23 are the mutually facing support sleeves 24 to which the abovementioned radial guides 21 of the clamping shoes 7 are attached. At their mutually facing ends, the support sleeves 24 are provided with a seal 25, so that the internal space determined by the support discs 23 and the support sleeves 25 is screened off with respect to the environment.

LIST OF REFERENCE NUMERALS

1. Clamping Device
2. Carriage
3. Wheels of Carriage
4. Introduction Head
5. Second (left) Clamping head
6. First (right) Clamping head
7. Clamping Shoe
8. Drive Mechanism
9. Drive Disc
10. Hydraulic Piston/Cylinder Device
11. Guide Means for Clamping Heads
12. Guide Body
13. Sliding Bearing
14. Wedge
15. Guide Pin
16. Oblique Surface of Guide Pin
17. Wedge Surface
18. Widened Head of Guide Pin
19. Sliding Bearing of Drive Disc
20. Roller Member
21. Radial guide (e.g., radially oriented cylinder)
22. Undercut Cavity of Wedge
23. Support Disc
24. Support Sleeve
25. Seal Between Support Sleeves
26. Rib of Introduction Head

The invention claimed is:

1. A clamping device for internally centering pipes with respect to one another, the device comprising:
   two clamping heads adapted to be placed into mutually facing ends of the pipes, each of said two clamping heads comprising radially displaceable clamping shoes which are evenly distributed over an external periphery of the clamping heads;
   an adjustment actuator for adjusting mutual positions of the clamping heads in an axial direction;
   a plurality of guide bodies positioned eccentrically with respect to the axial direction and that are adapted to guide the clamping heads in the axial direction with respect to one another; and bearings on at least one of the two clamping heads, wherein each of said two clamping heads further comprises a drive disc that is oriented transverse to the axial direction and that is displaceably supported on said guide bodies by bearings, wherein the drive disc is adapted to cooperate with respective ones of said clamping shoes to cause radial displacement of the respective said clamping shoes upon axial displacement of the drive disc along said guide bodies, and wherein each of the two clamping heads comprises an axial drive actuator for inducing axial displacement of the drive disc along the guide bodies.

2. The clamping device according to claim 1, wherein each of said clamping heads comprises a support disc which is oriented transversely with respect to the axial direction and which cooperates with the guide bodies.

3. The clamping device according to claim 2, wherein each of said clamping heads comprises a support sleeve which is attached to the support disc, said support sleeve having radial guides for the clamping shoes.

4. The clamping device according to claim 3, wherein mutually facing ends of the support sleeves of both of said two clamping heads comprise a seal for shielding an internal space inside the support sleeves.

5. The clamping device according to claim 2, wherein each of said axial drive actuators is attached to the support disc and to the drive disc of the respective one of said two clamping heads.

6. A clamping device for internally centering pipes with respect to one another, the device comprising:
a first clamping head and a second clamping head, which are adapted to be placed into two mutually facing ends of the pipes, wherein the second clamping head is repositionable relative to the first clamping head along an axial direction to adjust an axial gap width between the pipe ends;
two groups of clamping shoes, each group of clamping shoes being associated with a corresponding clamping head and distributed along an external periphery of the corresponding clamping head, the clamping shoes being radially displaceable relative to the respective clamping head to engage with a radial inner surface associated with a respective pipe end;
two drive discs, each drive disc associated with a corresponding clamping head and axially displaceable relative to the corresponding clamping head and adapted to cooperate with an associated group of clamping shoes to induce radial displacement of the group of clamping shoes;
a plurality of common guide bodies that are positioned in an eccentric manner relative to the axial direction, the first clamping head being rigidly fixed to the common guide bodies, and wherein the second clamping head and the two drive discs are displaceably supported on the same common guide bodies to be repositionable in the axial direction along the common guide bodies and with respect to the first clamping head and each other.

7. The clamping device according to claim 6, wherein the drive discs are situated between the first and second clamping heads, viewed along the axial direction.

8. The clamping device according to claim 6, wherein the first and second clamping heads each comprise an axial drive actuator for inducing axial displacement of the corresponding drive disc along the common guide bodies.

9. The clamping device according to claim 6, comprising an introduction head which radially converges to become narrow towards a free end thereof, wherein the first clamping head is fixed to first distal ends of the common guide bodies, and wherein the introduction head is fixed to second distal ends of the common guide bodies opposite to the first distal ends.

10. The clamping device according to claim 8, wherein the second clamping head is situated between the introduction head and the first clamping head, viewed along the axial direction.

11. The clamping device according to claim 8, wherein the adjustment actuator is directly attached to the introduction head.

12. The clamping device according to claim 6, wherein the first and second clamping heads each comprise a radial support disc, which is oriented transversely with respect to the axial direction, and wherein the second radial support disc is displaceably coupled to the common guide bodies to be independently repositionable in the axial direction along the common guide bodies with respect to the first radial support disc.

13. The clamping device according to claim 12, wherein each clamping head comprises an axial drive actuator that is attached to the support disc and to the drive disc of the respective clamping head.

14. The clamping device according to claim 12, wherein each clamping head comprises an annular support sleeve which is attached to the corresponding radial support disc, and which defines radial guides for the corresponding group of clamping shoes.

15. The clamping device according to claim 14, wherein the mutually facing ends of the support sleeves of both clamping heads comprise a seal for shielding an internal space defined inside the support sleeves.

16. The clamping device according to claim 6, comprising an adjustment actuator for adjusting in the axial direction the position of the second clamping head relative to the first clamping head.

17. The clamping device according to claim 6, wherein the clamping shoes each carry a clamping roll which is oriented along an axially directed axis of rotation.

18. The clamping device according to claim 6, wherein the drive disc and the associated clamping shoes mutually cooperate by means of slide faces which are directed obliquely in axial cross section.

19. The clamping device according to claim 18, wherein the drive disc and the associated clamping shoes mutually cooperate by means of an undercut slot and a widened head which can be moved to and fro in said undercut slot.

20. The clamping device according to claim 6, wherein the second clamping head comprises bearings and wherein the two drive discs comprise further bearings, the bearings and further bearings being adapted for allowing sliding motion of the second clamping head and drive discs along the common guide bodies and in the axial direction.

* * * * *